R. W. SHOEMAKER.
SUSPENDED MONORAIL SYSTEM.
APPLICATION FILED JUNE 24, 1918.
1,355,801.
Patented Oct. 12, 1920.
3 SHEETS—SHEET 3.
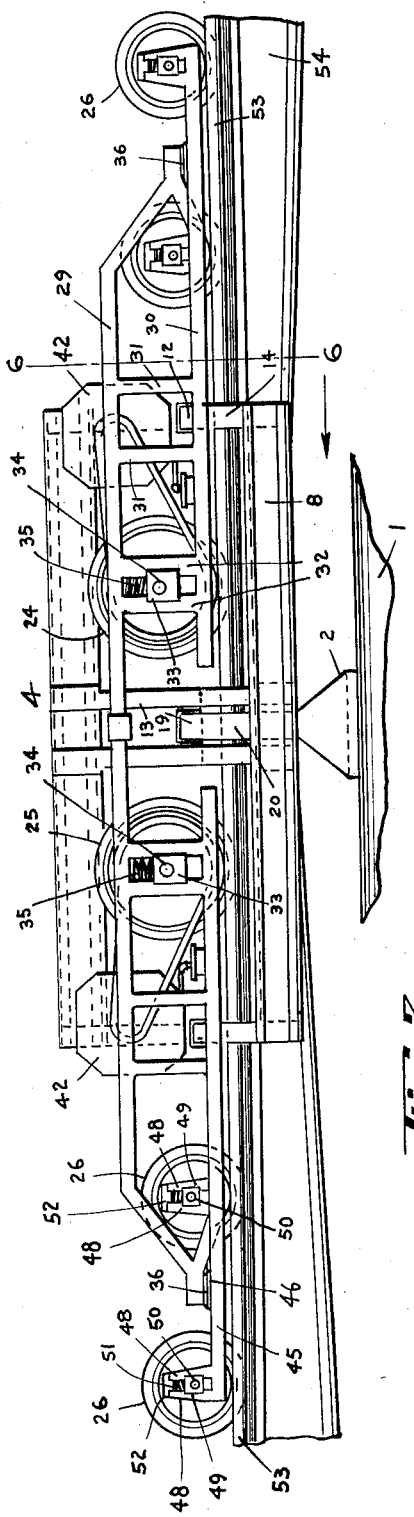
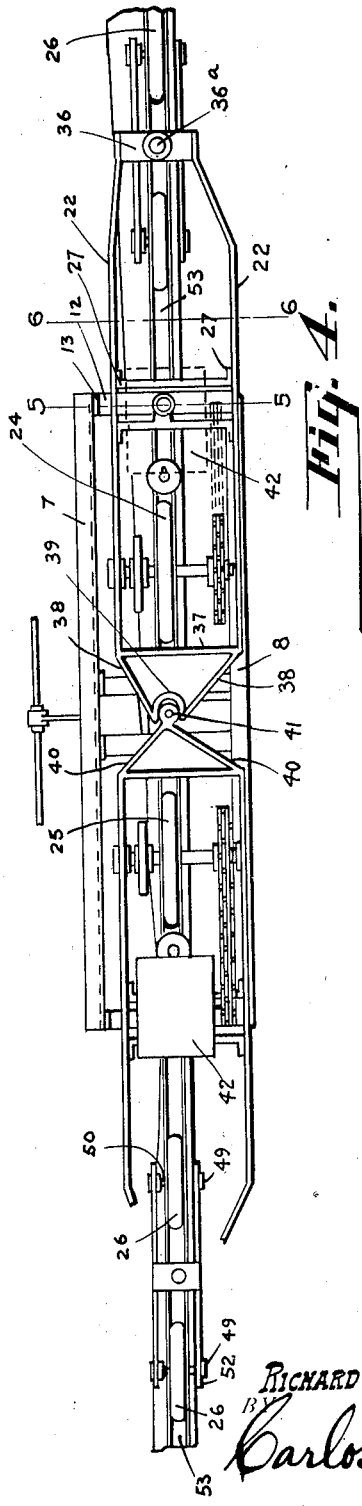
INVENTOR.
RICHARD W SHOEMAKER

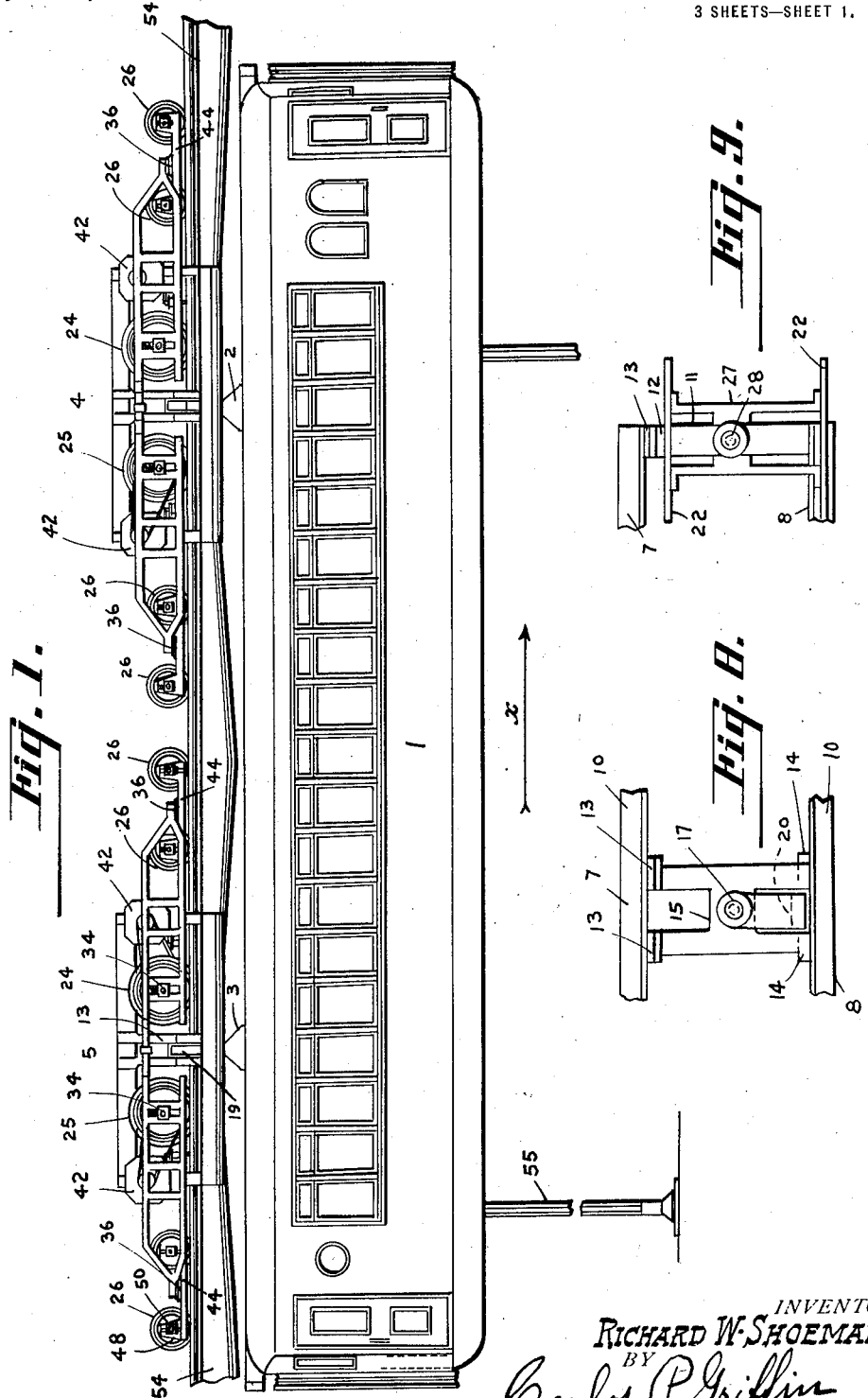

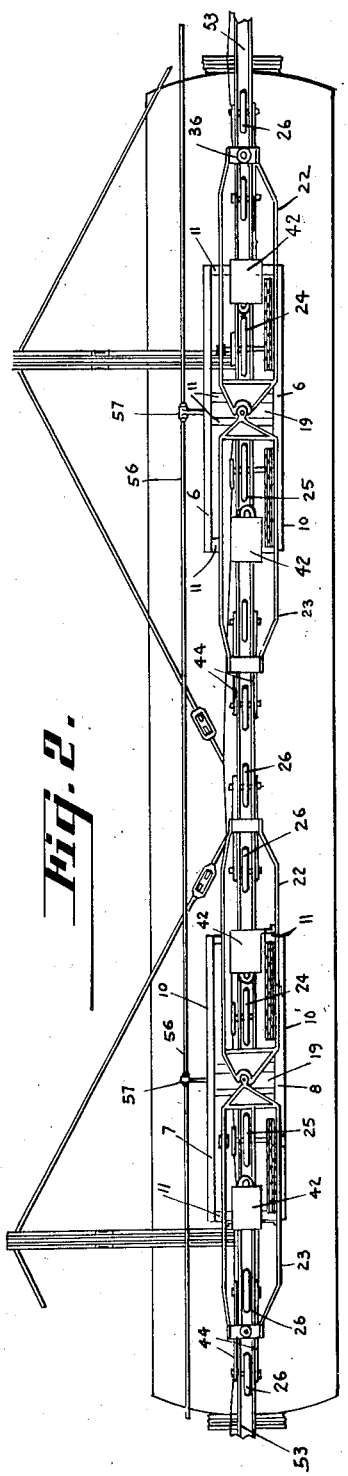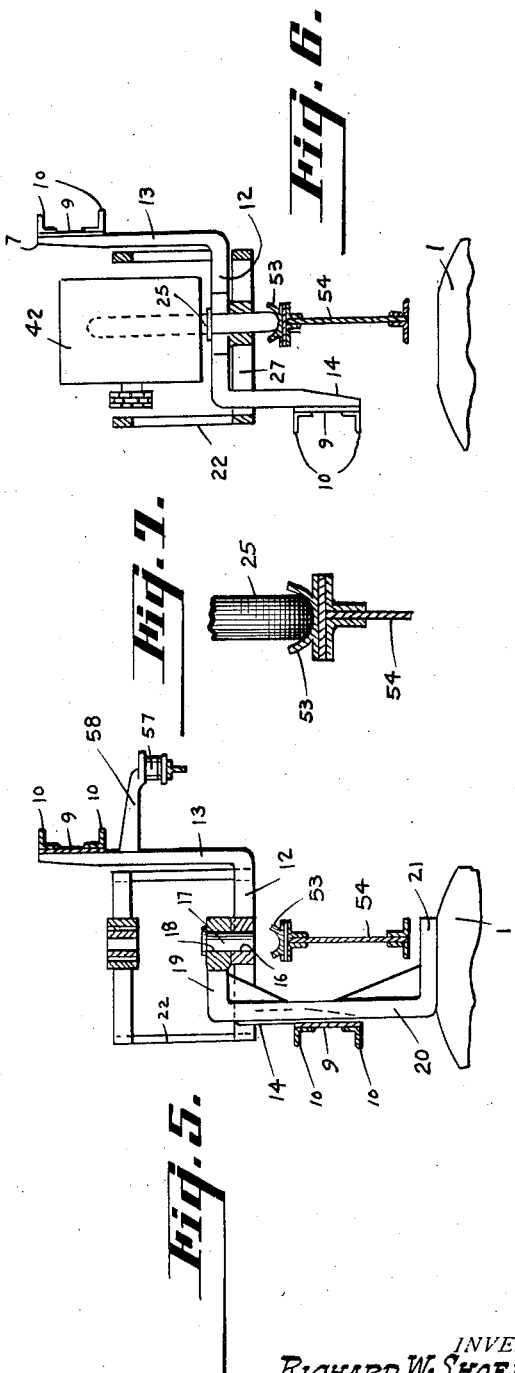

UNITED STATES PATENT OFFICE.

RICHARD W. SHOEMAKER, OF SEATTLE, WASHINGTON, ASSIGNOR TO NATIONAL SUSPENDED MONORAIL COMPANY, A CORPORATION.

SUSPENDED MONORAIL SYSTEM.

1,355,801.     Specification of Letters Patent.     Patented Oct. 12, 1920.

Application filed June 24, 1918. Serial No. 241,546.

*To all whom it may concern:*

Be it known that I, RICHARD W. SHOEMAKER, citizen of the United States, residing at Seattle, in the county of King, State of Washington, have invented a new and useful Suspended Monorail System, of which the following is a specification in such full and clear terms as will enable those skilled in the art to construct and use the same.

This invention relates to the car trucks of a monorail car, and to the general construction of the system, and an object of the invention is to build a truck which will distribute the load over a sufficient length of car rail to reduce the unit cost of the structure for supporting the car.

Another object of the invention is to so connect each individual truck with the car and with the adjoining trucks as to provide sufficient horizontal flexibility of the series of trucks as to permit the car to travel without danger at high speed over sharp curves.

Another object of the invention is to provide the trucks with a driving wheel so positioned with respect to the leading wheels as to prevent the likelihood of the wheels leaving the track owing to the driving wheel climbing off, if not properly guided.

Another object of the invention is to suspend the car so as to permit it to swing freely laterally when going around curves, so that the complications of the car construction will be reduced, and so that the passengers' equilibrium will not be disturbed when the car goes around sharp curves at a high speed.

A further object of the invention is to produce a truck rail and driving wheels in which there will be comparatively no lateral rail friction since the wheels always bear perpendicularly upon the portion of the rail with which they contact regardless of the curve which the truck takes, thereby eliminating much noise and wear.

To these ends the invention consists in the features of novelty that are hereinafter described with reference to the accompanying drawings which are hereby made a part of this specification and in which:—Figure 1 is a side elevation of a single suspended car of a monorail system embodying the invention and viewed from the lower side of Fig. 2.

Fig. 2 is a plan view thereof.

Fig. 3 is a side elevation of one of the trucks on a larger scale.

Fig. 4 is a plan view thereof.

Fig. 5 is a vertical transverse section through the center of one of the trucks as indicated by the line 5—5, Fig. 4, looking in the direction of the arrows.

Fig. 6 is a vertical transverse section of one of the trucks on the line 6—6, Figs. 3 and 4, looking in the direction of the arrows.

Fig. 7 is a section showing fragments of one of the driving wheels and the track.

Fig. 8 is a detail showing the middle portion of the main frame and the upper portion of the hanger.

Fig. 9 is a detail showing one end of the main frame and an intermediate portion of the driver frame.

The drawings show but one car, 1, although a train of two or more may be used and when two or more are made up in a train their meeting ends are preferably vestibuled, after the manner of a Pullman car. The ends of the car are suspended, through the medium of hangers 2 and 3, from independent trucks 4 and 5, respectively.

Both trucks are precisely alike so that excepting where it becomes necessary to refer to both of them the following description will be confined to but one. For this purpose the truck 4 is selected. This is the forward truck, as the system is shown in the drawings and with the car traveling in the direction of the arrow, albeit the car is equally capable of traveling in either direction. When traveling in the direction opposite that indicated by the arrow, the truck 5 becomes the forward truck.

The truck has a rigid main frame 6 made up as follows: 7 and 8 are two stout rails or beams which are in effect channel irons although each is not an integral entity. On the contrary each is made up of a flat plate 9 and two angle irons 10 which are firmly secured along the longitudinal edges of the plate.

These beams 7 and 8 are rigidly connected by a suitable number of tie bars 11. The intermediate portion 12 of each of these tie bars is horizontal while one of its ends projects vertically upward as shown at 13 and is firmly secured to the beam 7—and its other end projects vertically downward as shown at 14 and is firmly secured to the beam 8 whereby the beams are rigidly connected. The intermediate horizontal portion 12 of the central tie bar is of H shape as shown in Fig. 8, and the portion 15 which connects the "legs" of the H has a central perforation 16 for the passage of a pivot pin 17 which passes also through a perforation 18 formed through the horizontal arm 19 of the hanger 2. This hanger comprises the aforesaid horizontal arm 19 a vertical portion 20 depending from the outer end thereof and a second horizontal arm 21 projecting inward from the lower end of the portion 20 and secured to the car 1. By this means the entire rigid main frame 6 may turn in either direction relatively to the car after the manner in which the truck of an ordinary railway car turns about the king pin in turning curves.

The rigid frame 6 is supported by two frames 22 and 23 and each of these frames is supported in part by one of the drivers 24 and 25 and in part by two wheels 26 which are alike and may be called pilot wheels (or rail finders) or trailers accordingly as they happen to be at the forward or at the rear end of the truck.

The frame 6 is supported by the frames 22 and 23 through the medium of the end tie bars 11, the horizontal portions 12 of which rest upon bridge pieces 27 of H-shape, the ends of the legs of which are firmly secured to the opposite sides of the frames 22 and 23. At their intersection the bridge piece 27 and the horizontal portion 12 which rests upon it are perforated for the passage of a pivot pin 28 about which each of the driver frames 22 and 23 can turn horizontally in either direction.

Each side of each of the frames 22 and 23 comprises a top horizontal member 29 and a bottom horizontal member 30 connected by vertical slats 31 and 32. The slats 31 are simply connections between the members 29 and 30 but the slats 32 not only serve as connections but in addition they form guides between which the journal boxes 33 for the journals 34 of the drivers 24 and 25 slide, vertically. Cushioning springs 35 are arranged between the top sides of the journal boxes and the top member 29.

The outer ends of the top and bottom members come together, considered vertically and converge toward each other considered horizontally and are connected by a cross tie 36 perforated for the passage of a pivot pin 36ª for a purpose that will appear presently. Near their inner ends the opposite top members of each of the driver frames 22 and 23 are connected by a crosspiece 37. These top members 29 of the frame 22 are continued inward beyond the cross piece 37, as shown at 38, and converge, their inner ends being united by a U-shaped piece 39 which forms a socket.

The top members 29 of the frame 23 also are continued inward beyond the cross piece 37 as shown at 40 and their inner ends are united and carry a fitting having a cylindrical head 41 which occupies the socket 39 so that when one of the frames 22 or 23 is moved about its pivot pin 28 in one direction the other of said frames will be moved about its pivot pin in the opposite direction.

Each of the frames 22 and 23 carries an electric motor 42 which motors are geared by belts 43 or any other suitable means to the drivers 24 and 25, respectively.

There are two of the wheels 26, at each end of the truck, and as before stated those at the forward end, as the car is, for the time being, traveling, may be called pilot wheels, or they may be called rail finders while those at the rear end are hereinafter called trailers, but this terminology is entirely immaterial.

Each of the several pairs of wheels 26 is mounted in a frame 44 (Figs. 1 and 2) which is made up of two parallel beams 45 (Figs. 3 and 4) connected by a cross tie 46 which lies directly beneath the cross tie 36 and has a perforation 47 for the passage of the pivot pin 36ª whereby the frame 44 is pivoted to the outer end of the corresponding driver frame thereby permitting the frames 44 to turn freely in either direction independently of the driver frames.

Rising from the ends of the beams 45 are guides 48 between which are mounted to slide, vertically, the journal boxes 49 of the journals 50 of the wheels 26. Cushioning springs 51 are arranged between the top sides of the journal boxes and caps 52 secured to the tops of the guides 48.

The rail is shown at 53. Its top side has a groove the surface of which describes an arc of a circle and the tread of the driver is formed on a similar arc but it embraces a less number of degrees, as shown more clearly in Fig. 7, so that the sides of the wheel do not have lateral frictional contact with the sides of the groove of the rail, while the entire curved surface of the tread bears throughout upon the correspondingly curved surface of the rail whether the wheel is in vertical or in inclined position. This obviates much noise and reduces the friction to only that due to traction. The rail is supported by a heavy beam or stringer 54, which, in turn is supported by suitable towers 55 the details of the construction of which are not shown in the drawings because they form no part of the present invention.

The motors take their current from a feed wire or rail 56 through the medium of a brush 57 carried by an arm 58 projecting laterally from the upwardly extending vertical portion 13 of the central tie bar 11. It will be understood that suitably insulated conductors extend from the brush to the controller, which is indicated by dotted lines at 59 and thence to the motor.

It will be observed that but one driver is mounted in each driver frame and that the cylindrical fitting 41 occupying the U-shaped socket 39 permits the driver frames to rise and fall relatively to each other and to teeter upon the driver. This gives the truck great vertical flexibility and allows the driver to rise and fall in response to inequalities in the track.

The distance between the pivot 36ª at which point the load is transmitted from the driver frame to the frame 44, and the pivot pin 28 at which point the main frame bears upon the driver frame is greater than the distance from the point last aforesaid and the point of contact between the driver and track, at which the point the weight put upon the main frame is sustained. This amounts to a difference in leverage which causes a greater proportion of the load to fall upon the drivers than upon the wheel 26, the difference being preferably about as fifteen is to forty.

Being thus less heavily loaded, the wheels 26 respond more readily to curvatures in the track. In following curves the frame 44 at the forward end of the truck is moved bodily laterally. This, acting through the pivot pin 36ª about which the frame 44 also turns, moves the forward end of the driver frame 22 laterally and thus turns the driver 24 to a plane approximately in line with the curve. In doing this the driver frame 22 moves about its pivot pin 27 and its inner end therefore moves in a direction opposite that in which its outer end moves. This, acting through the joint 39—41, will cause the driver frame 23 to turn in the direction opposite that in which the frame 22 was turned and this will shift the driver 25 and will move the frame 44 of the trailers 46, laterally.

The centrifugal force due to the turning of a curve will cause the car to swing outward, turning about the points of contact of the treads of the wheels with the rail. This will tip the wheels and cause their treads to leave the extreme bottom of the groove of the rail more or less and ride up the side thereof but will not cause the treads to leave the rail at any point since they are formed on arcs of a circle of the same radius as the curved surface of the groove of the rail so that the curved portions of the treads will bear throughout upon the rail. This eliminates all lateral friction upon the wheels and maintains the maximum tractional friction with the result that much noise and wear and tear are eliminated.

This tipping of the car also has the result of bringing the axes of all of the normally vertical pivots exactly in the load line so that they will turn freely and will not cramp or bind.

The several wheels are unequally spaced apart. That is to say the wheels 26 of each pair are closer together than any other two wheels; the inner wheel 26 of each pair and the adjacent driver 24 or 25, as the case may be are farther apart than any other adjacent two wheels and the drivers 24 and 25 are an intermediate distance apart. Furthermore the drivers 24—25 are of greater diameter than the wheels 26.

What I claim as new is:

1. In a suspended railway, the combination of a single rail having in its top side a groove the surface of which is formed on an arc and a truck having a plurality of wheels the treads of which occupy said groove and are formed on an arc but embrace a less number of degrees than said groove, the end wheels of the truck being smaller than the intermediate wheels and differently loaded, a car, and a hanger suspending said car from the truck.

2. In a suspended railway, the combination of a single rail having in its top side a groove, and a truck having two separate frames, a single wheel mounted in each of said frames and supporting its inner end, smaller wheels at the outer ends of said frames carrying a smaller load than the outer wheels, said wheels having treads occupying said groove, a rigid main frame supported by the frames aforesaid, a car, and a hanger by which the car is suspended from the main frame.

3. In a suspended railway, the combination of a single rail having a groove in its top side and a truck having two separate, relatively movable, frames, a single wheel supporting the inner end of such of said frames and the treads of which wheels run in said groove, smaller wheels at the outer ends of said frames carrying lighter loads than the larger wheels, a motor carried by each of said frames, gearing between said motors and wheels, respectively, and means supporting the outer ends of said frames.

4. In a suspended railway, the combination of a single rail having a groove in its top side and a truck having two separate, relatively movable, frames, a single wheel supporting the inner end of each of said frames, a motor carried by each of said frames, gearing between said motors and wheels, respectively, pilot wheels supporting the forward end of the forward frame and trailers supporting the rear end of the rear frame.

5. In a suspended railway, the combination of a single rail having a groove in its top side, and a truck having two separate, relatively movable, frames, a single wheel supporting the inner end of each of said frames, a motor carried by each of said frames, gearing between said motors and wheels, respectively, pilot wheels, a frame supported thereby, a pivotal connection between said frame and the forward end of the forward one of the frames first aforesaid, trailers, a frame supported thereby and a pivotal connection between said frame and the rear end of the rear one of the frames first aforesaid.

6. In a suspended railway the combination of a single rail having a groove in its top side, a truck having two separate, relatively movable frames, a single wheel supporting the rear end of each of said frames the treads of which wheels run in said groove, a main frame supported by and connecting the frames first aforesaid, pivots connecting the frames first aforesaid and the main frame, a joint connecting the inner ends of the frames first aforesaid and means supporting the outer ends of said frames.

7. In a suspended railway, the combination of a single rail having in its top side a groove, a truck, having two separate movable frames, a single wheel mounted in each of said frames and the treads of which run in said groove, and means separate from said frames for supporting their outer ends.

8. In a suspended railway, the combination of a single rail having in its top side a groove, a truck having two wheels the treads of which run in said groove, separate frames each supported at its inner end by one of said wheels, pilot wheels the treads of which run in said groove, a frame supported by said pilot wheels and by which the forward end of the forward one of the frames first aforesaid is supported, trailers the treads of which run in said groove and a frame supported by said trailers and by which the rear end of the rear one of the frames first aforesaid is supported.

9. In a suspended railway, the combination of a single rail having a groove in its top side, a truck having two wheels, the treads of which run in said groove, separate frames each supported at its inner end by one of said wheels, pilot wheels the treads of which run in said groove, a frame supported by said pilot wheels and by which the forward end of the forward one of the two frames first aforesaid is supported, a pivot pin connecting said forward end with the pilot wheel frame, trailers the treads of which run in said groove, a frame supported by said trailers and by which the rear end of the rear one of the frames first aforesaid is supported, and a pivot pin connecting said rear end of the rear one of the frames first aforesaid and the trailer frame.

10. In a suspended railway, the combination of a single rail having a groove in its top side, a truck having two drive wheels, the treads of which run in said groove, separate frames each supported at its inner end by one of said wheels, means for supporting its outer end, a main frame supported by the frames aforesaid, pivots connecting the main frame and the frames first aforesaid, and a motor carried by each of the frames first aforesaid and geared with the corresponding driver.

11. In a suspended railway, the combination of a single rail having a groove in its top side, a truck having two wheels the treads of which run in said groove, separate frames each supported at its inner end by one of said wheels, a main frame the ends of which are supported by said frames, respectively, a hanger depending from the center of the main frame and supporting the car, pilot wheels, a frame supported by said pilot wheels and in turn supporting the forward end of the forward one of the frames first aforesaid, the distance between the point of support of the main frame and the point of support of the forward end of the forward one of the frames first aforesaid being greater than the distance between the point of support of the main frame and the point of contact of this drive wheel with the rail.

12. In a suspended railway, the combination of a single grooved rail, a truck having two large drive wheels adapted to run in said rail, other smaller wheels, separate frames connecting the smaller wheels and one of the larger wheels, said frames being pivotally connected together, a frame mounted upon the separate frames, and a car connected with the latter frame the wheels being placed so that the larger wheels bear a greater load than the smaller wheels.

13. In a suspended railway, the combination with a single grooved rail of a pair of trucks having large drive wheels and other small wheels, means to pivotally connect the frames, another frame mounted on the pivotally connected frames, and a car depending from and supported by the latter frame, said car having wheeled trucks at each end thereof.

14. In a suspended railway, the combination with a single grooved railway of a pair of trucks, each truck comprising a pair of large wheels, a plurality of smaller wheels, frames connecting the wheels and arranged to unequally load said wheels, pivotal connections between the front and rear frames of each set of trucks, and a frame pivotally mounted upon the wheeled frames with means to connect the car therewith at both ends of said car.

In testimony whereof I have hereunto set my hand this 12th day of June, A. D. 1918.

RICHARD W. SHOEMAKER.